(12) United States Patent
Li

(10) Patent No.: US 10,795,105 B1
(45) Date of Patent: Oct. 6, 2020

(54) HIGH-DENSITY FIBER DISTRIBUTION TRAY

(71) Applicant: Shenzhen Fibercan Optical Co., Ltd., Shenzhen (CN)

(72) Inventor: Yaole Li, Shenzhen (CN)

(73) Assignee: Shenzhen Fibercan Optical Co., Ltd., Shenzhen (CN)

( * ) Notice: Subject to any disclaimer, the term of this patent is extended or adjusted under 35 U.S.C. 154(b) by 0 days.

(21) Appl. No.: 16/452,331

(22) Filed: Jun. 25, 2019

(30) Foreign Application Priority Data

May 17, 2019 (CN) .......................... 2019 1 0413645

(51) Int. Cl.
*G02B 6/44* (2006.01)

(52) U.S. Cl.
CPC ......... *G02B 6/4452* (2013.01); *G02B 6/4455* (2013.01); *G02B 6/4471* (2013.01)

(58) Field of Classification Search
None
See application file for complete search history.

(56) References Cited

U.S. PATENT DOCUMENTS

| | | | | |
|---|---|---|---|---|
| 6,456,772 B1* | 9/2002 | Daoud | ................. | G02B 6/4471 385/135 |
| 7,272,291 B2* | 9/2007 | Bayazit | ................ | G02B 6/4454 385/135 |
| 7,409,137 B2* | 8/2008 | Barnes | ................. | G02B 6/4455 312/331 |
| 7,945,138 B2* | 5/2011 | Hill | ....................... | G02B 6/4454 385/135 |
| 9,250,409 B2* | 2/2016 | Blackwell, Jr. | ....... | G02B 6/4452 |
| 9,500,833 B1* | 11/2016 | Xu | ......................... | G02B 6/4452 |
| 10,514,518 B1* | 12/2019 | Livingston | ........... | G02B 6/4452 |
| 10,539,757 B2* | 1/2020 | Ruiz | .................... | G02B 6/4452 |
| 2010/0322582 A1* | 12/2010 | Cooke | .................. | G02B 6/4452 385/135 |
| 2013/0308915 A1* | 11/2013 | Buff | ..................... | G02B 6/4452 385/135 |
| 2014/0003782 A1* | 1/2014 | Blackwell, Jr. | ....... | G02B 6/4455 385/135 |
| 2016/0062050 A1* | 3/2016 | Giraud | ................. | G02B 6/3825 385/56 |
| 2016/0062068 A1* | 3/2016 | Giraud | ................. | G02B 6/3885 385/135 |
| 2017/0153399 A1* | 6/2017 | Rodriguez | ........... | G02B 6/4454 |

(Continued)

*Primary Examiner* — Rhonda S Peace
(74) *Attorney, Agent, or Firm* — Inskeep IP Group, Inc.

(57) ABSTRACT

A high-density fiber distribution tray which includes a tray body is provided. The tray body provides a distribution area, a terminal area and a cover body. The distribution area includes an input mounting area, an output mounting area and a fiber storage area. The terminal area is arranged on a side surface of the output mounting area. The fiber storage area includes a removable welding socket which may be mounted from a plurality of directions. The high-density fiber distribution tray is small in size, thin in thickness with high adapter density and proper distribution. The welding socket may be removed and different welding sockets may be switched, which realizes a plurality of mode conversions between the input and the output. The tray body may be dragged within the slide rail by dragging a handle, and a baffle panel may be removed or mounted as needed.

10 Claims, 10 Drawing Sheets

(56) References Cited

U.S. PATENT DOCUMENTS

| | | | |
|---|---|---|---|
| 2017/0153406 A1* | 6/2017 | Rodriguez | G02B 6/4452 |
| 2018/0095232 A1* | 4/2018 | Feng | G02B 6/3897 |
| 2019/0004268 A1* | 1/2019 | Vogel | H04Q 1/13 |
| 2020/0018907 A1* | 1/2020 | Li | G02B 6/3857 |

\* cited by examiner

HIGH-DENSITY FIBER DISTRIBUTION TRAY

RELATED APPLICATIONS

This application claims priority to Chinese Patent Application No. 201910413645.0, filed May 17, 2019, which is hereby incorporated herein by reference in its entirety.

TECHNICAL FIELD

The present disclosure relates to the field of optical communication, specifically to fiber adapter accessory and fiber welding, and more specifically to a high-density fiber distribution tray.

BACKGROUND

With the popularization of cloud computing and big data, large data centers have been developing continuously as infrastructures. At the same time, higher requirement has been made for the density of fiber adapters in a fiber distribution cabinet. Due to factors including wiring distribution mode and ease of use, volume of the tray cannot be reduced substantially, resulting in the low space utilization rate of the entire fiber distribution cabinet, thus limiting room for improving fiber distribution cabinet density significantly. In actual practice, in order to meet the requirement of 144 cores in 1 U space, multiple fiber distribution cabinets are combined, resulting in large space occupation and high cost. In addition, there exist numerous different modes of conversion among LC, SC and MTP/MPO for fiber transmission; therefore, different distribution trays need to be switched, which increases the cost for production and use. In addition, the distribution tray cannot be removed from the distribution cabinet flexibly, which is inconvenient for mounting and maintaining of the distribution optical cable or connection optical cable. Therefore, it is desirable urgently to provide a fiber distribution tray with small size, high density, and capable of achieving numerous mode conversions, rational distribution, and ease of use and maintenance.

SUMMARY

In order to solve the deficiency in the prior art, a high-density fiber distribution tray is provided by the present disclosure.

Technical solutions for solving the technical problem of the present disclosure include: a high-density fiber distribution tray comprises a tray body in which a plurality of mode conversions between an input and an output may be achieved; the tray body is provided with a distribution area, a terminal area and a cover body which is removable and clamped to the distribution area; the distribution area includes an input mounting area, an output mounting area and a fiber storage area arranged between the input mounting area and the output mounting area; the terminal area is arranged on a side surface of the output mounting area.

Preferably, the high-density fiber distribution tray further comprises a slide rail; the tray body is limited within the slide rail and can be dragged in the slide rail; the slide rail includes a first limit side, a second limit side and a fixed side; a slide slot is enclosed by the fixed side, the first limit side and the second limit side; the first limit side and/or the second limit side is provided with a first through hole, a limit arm extending beyond an inner side surface of the first through hole, and a limit clamp point arranged on the limit arm and facing the slide slot.

Preferably, the limit arm is thinner than the first limit side or the second limit side; a gap between a side of the first limit side or the second limit side away from the slide slot and the limit arm is formed for the limit arm to move therein; two sides of the tray body respectively include a slide bar corresponding to and limited in the slide slot; the slide bar includes a first clamp site corresponding to the limit clamp point.

Preferably, a bottom of the terminal area is provided with a first bottom hole and a limit block which facilitate plugging and unplugging of the terminal adapter; side holes are provided in two sides of the terminal area for distribution; wire entry grooves are provided in upper sides of the side holes; an external side of the terminal area is provided with a removable baffle panel and a handle which drags the tray body within the slide rail. An external surface of the handle is provided with a grain which increases friction between a user and the handle; a side surface of the baffle panel is provided with a stop block corresponding to the limit block.

Preferably, a first supporting side for supporting the cover body is provided on two sides of the fiber storage area; the first supporting side is provided with a second clamp buckle for clamping the cover body to an upper end surface of the distribution area; the second clamp buckle is of an inverted-L shape.

Preferably, the cover body comprises a second clamp site corresponding to the second clamp buckle; an external side of the cover body is provided with a concave paste area for pasting a sign; an inner side of the cover body is provided with a stiffener for increasing rigidity and a limit bar; the cover body is provided with protrusions which are inserted into the output mounting area on one side of the cover body close to the output mounting area, and an avoidance site is arranged between each of two adjacent protrusions.

Preferably, the input mounting area includes a first mounting site for mounting an input adapter, and a cable entry port for mounting input cables; two sides of the first mounting space are respectively provided with a T-shaped baffle plate for clamping the input adapter; a bottom of the cable entry port is configured with a cable fixing seat which includes a second through hole; a removable baffle sheet is arranged at openings of the first mounting site and of the cable entry ports.

Preferably, the fiber storage area is provided with an excess length regulating device consisting of a plurality of arc-shaped restraint units; the fiber storage area is provided with a socket mounting area, which is arranged in a central position of the excess length regulating device; the socket mounting area is configured with a plurality of socket mounting holes and a plurality of positioning holes for mounting a welding socket.

Preferably, the output mounting area comprises a plurality of second mounting sites, which are arranged side by side linearly, for mounting output adapters; the second mounting sites include second bottom holes; a barrier is arranged between each two adjacent second mounting spaces.

Preferably, the fiber storage area includes a removable welding socket which is mounted from a plurality of directions; the welding socket is configured with a first clamp buckle, a positioning column, a welding protection sleeve slot and/or an optical splitter slot.

The high-density fiber distribution tray of the present disclosure is small in size, thin in thickness with high adapter density and proper distribution. Therefore, a 1 U distribution cabinet can contain 6 high-density fiber distribution trays of the present disclosure and may meet the volume requirement of cores. At the same time, the welding socket may be removed and different welding sockets may be switched, which realizes a plurality of mode conversions between the input and the output. The tray body may be dragged within the slide rail by dragging the handle, and the baffle panel may be removed or mounted as needed, which facilitate mounting and maintenance for distributing or connecting cable. The present disclosure is compact in structure, ease of mounting, low in duty factor, realizing miniaturization and high density of the fiber distribution tray in the premise of guaranteeing fiber transmission performance.

BRIEF DESCRIPTION OF THE DRAWINGS

The present disclosure will be further explained in combination with the drawings and embodiments below.

DETAILED DESCRIPTION OF THE EMBODIMENTS

Figure 1:
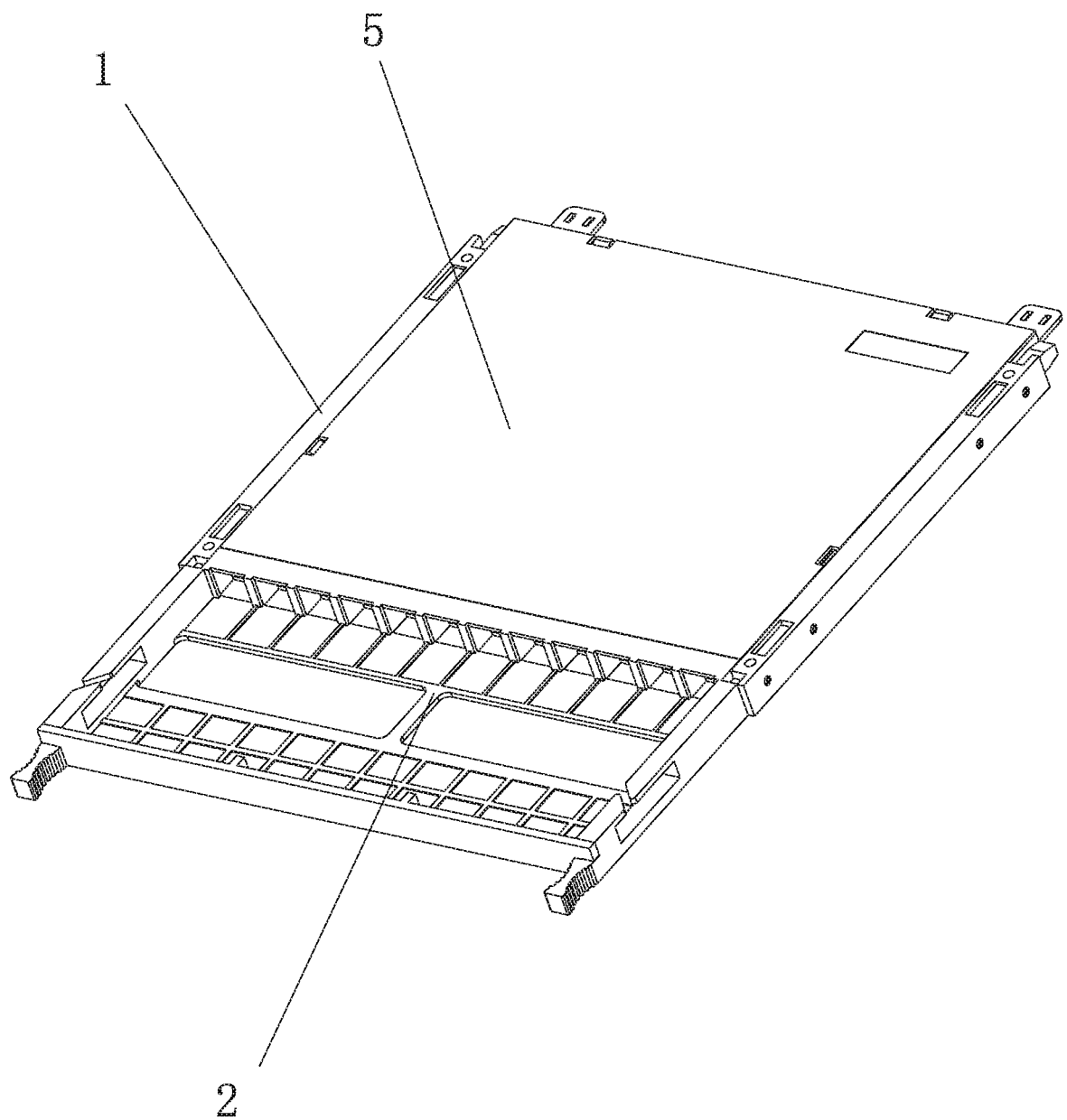
FIG. 1 is a structural schematic view of the present disclosure.
Figure 2:
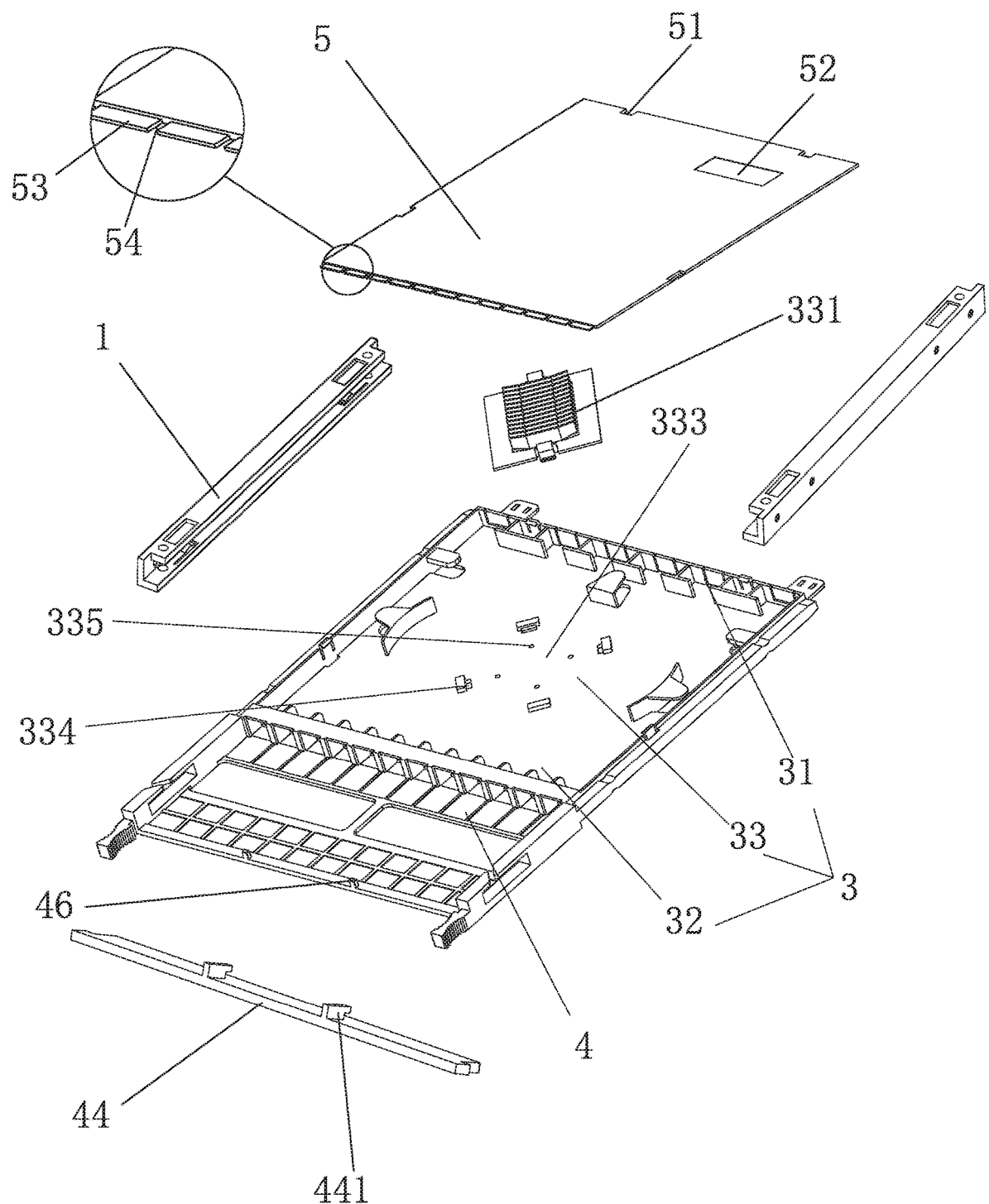
FIG. 2 is an exploded schematic view of the present disclosure.
Figure 3:
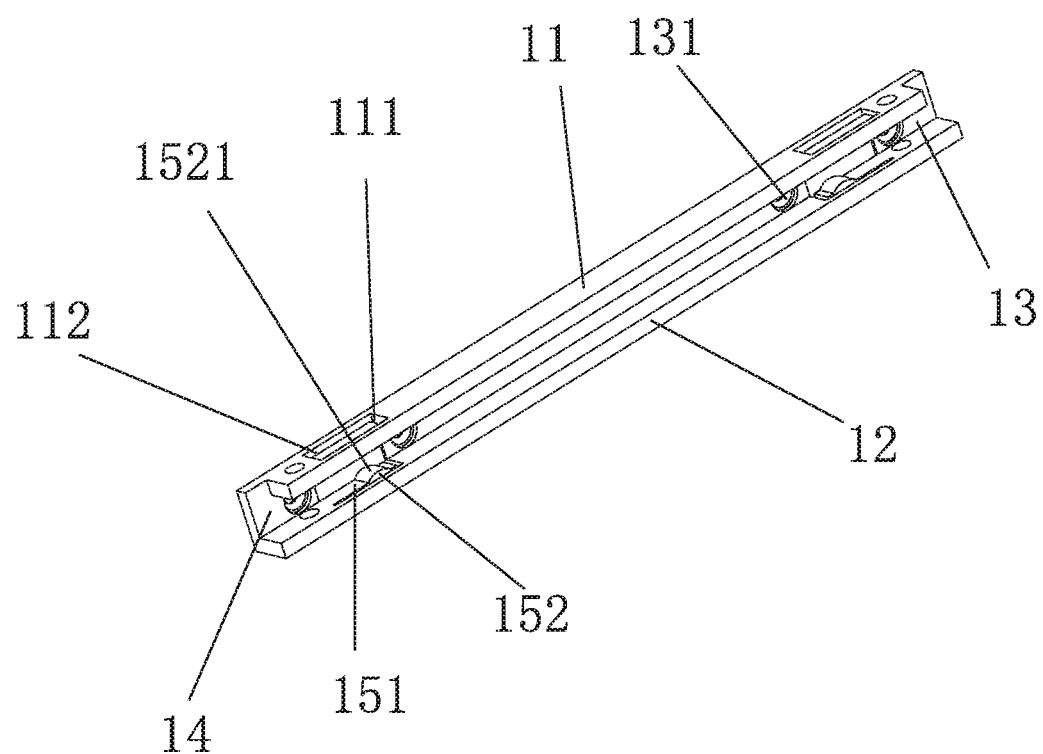
FIG. 3 is a structural schematic view of a slide rail of the present disclosure.
Figure 4:
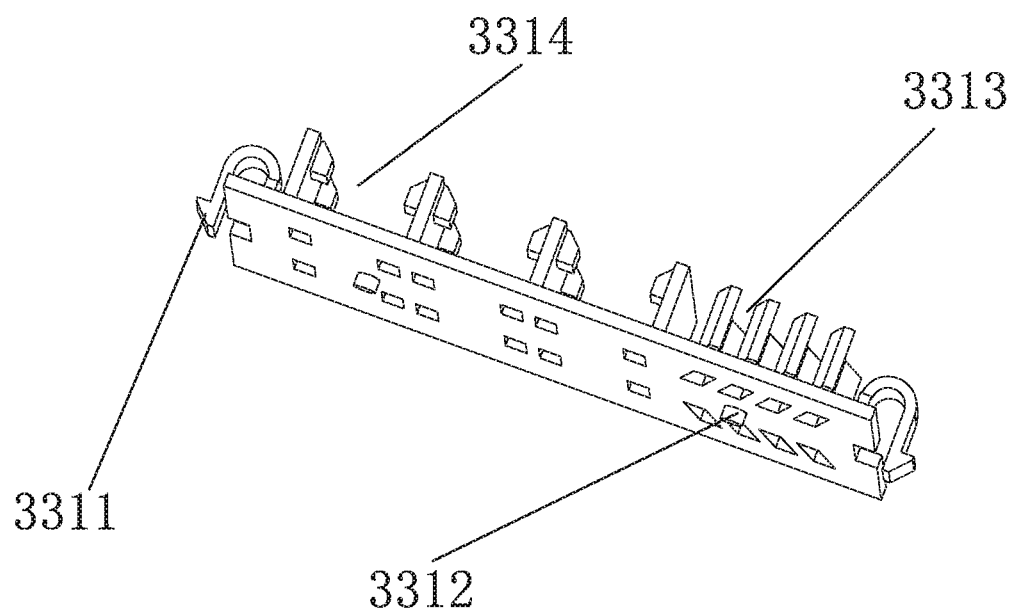
FIG. 4 is a structural schematic view of a welding socket of the present disclosure.
Figure 5:
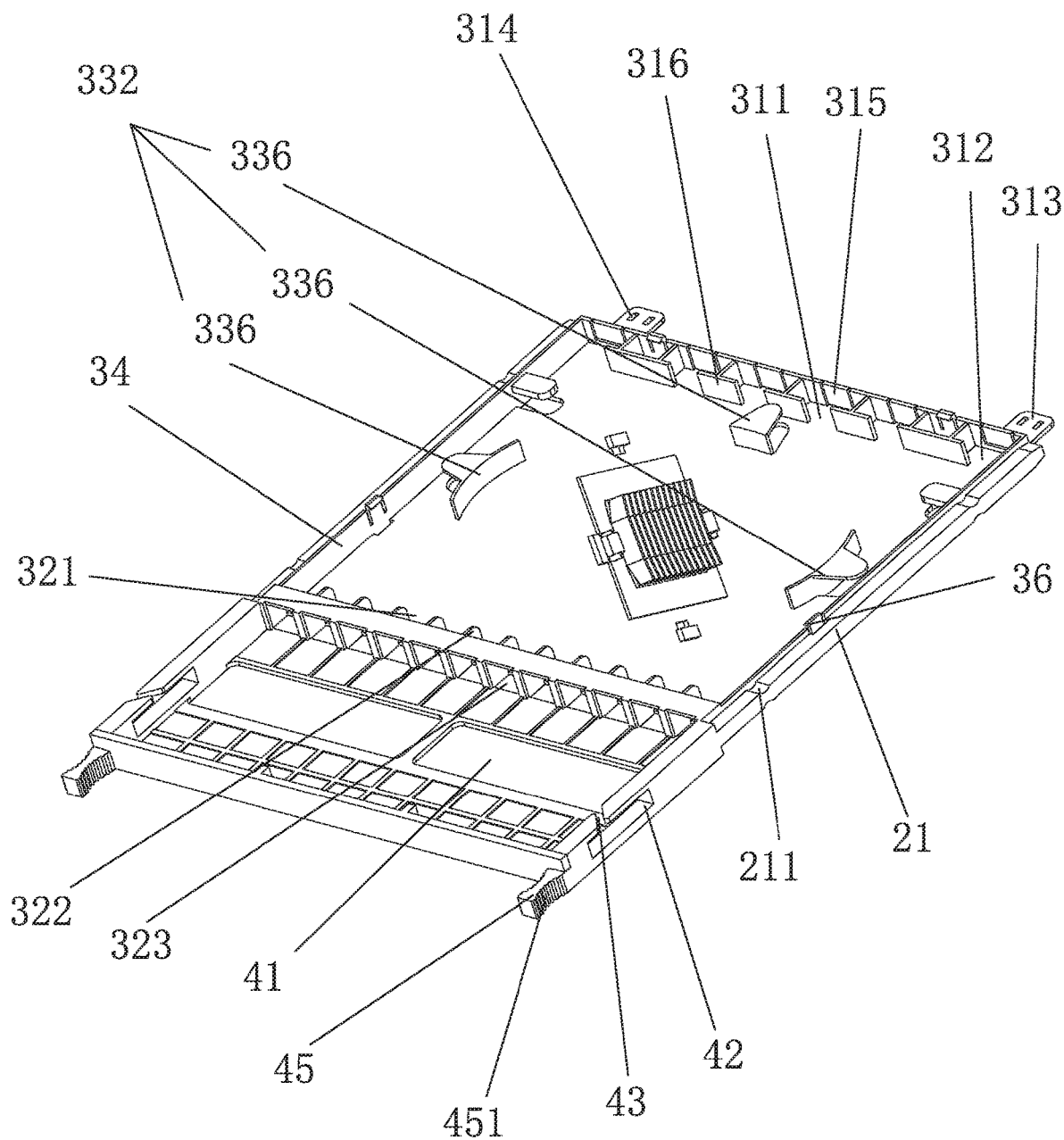
FIG. 5 is a structural schematic view of a welding tray body of the present disclosure.
Figure 6:
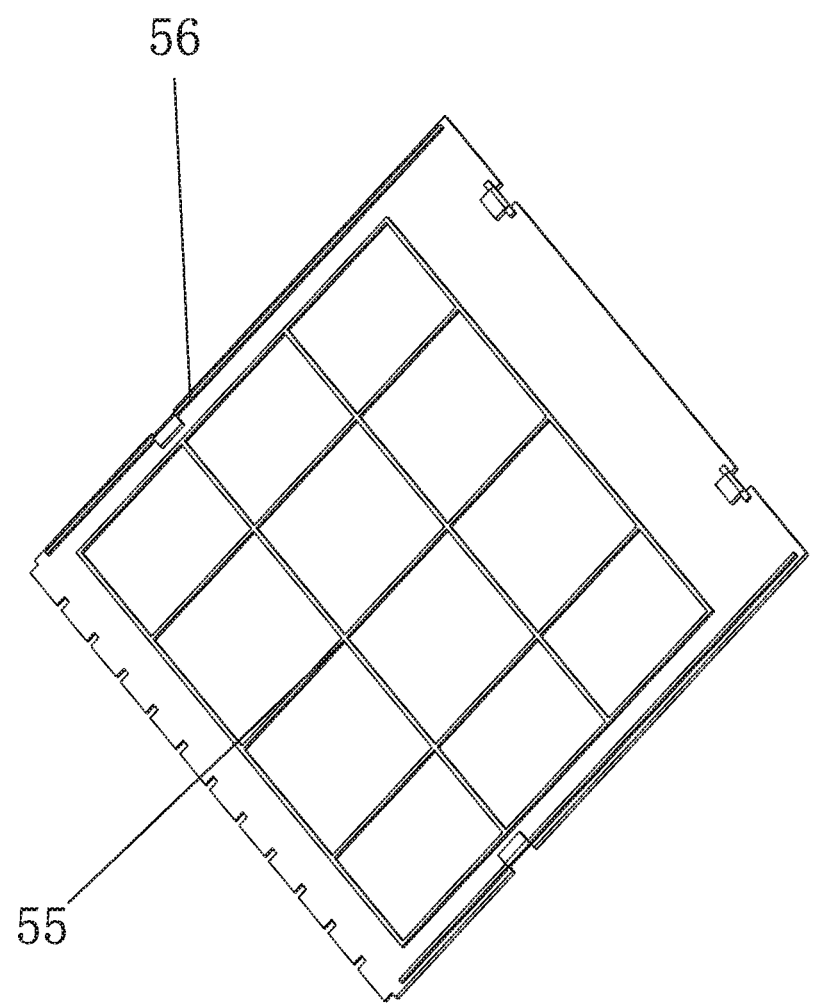
FIG. 6 is a structural schematic view of a welding cover body of the present disclosure.

Referring to FIGS. 1-6, the present disclosure is provided with a high-density fiber distribution tray which includes a slide rail 1 and a tray body 2 in which numerous mode conversions between an input and an output may be achieved. The tray body 2 is limited within the slide rails 1 and can be dragged in the slide rails 1. The tray body 2 is provided with a distribution area 3, a terminal area 4 and a cover body 5 which is removable and clamped to the distribution area 3. The distribution area 3 includes an input mounting area 31, an output mounting area 32 and a fiber storage area 33 arranged between the input mounting area 31 and the output mounting area 32. The terminal area 4 is arranged on a side surface of the output mounting area 32.

The thickness of the tray body 2 is such that an adapter may be just contained therein, which is 1.2 cm in the embodiment of the present disclosure.

Each slide rail 1 includes a first limit side 11, a second limit side 12 and a fixed side 13. A slide slot 14 is enclosed by the fixed side 13, the first limit side 11 and the second limit side 12. The fixed side 13 is provided with a screw mounting hole 131. The fixed side 13 is connected to a distribution cabinet 400 through a thread passing through the screw mounting hole 131. The first limit side 11 and/or the second limit side 12 is provided with a first through hole 111, a limit arm 151 extending from an inner side surface of the first through hole 111 and a limit clamp point 152 arranged on the limit arm 151 and facing the slide slot 14.

One side of the limit clamp point 152 facing the slide slot 14 is provided with a raised camber surface 1521.

The limit arm 151 is thinner than the first limit side 11 or the second limit side 12. A gap 112 between a side of the first limit side 11 or the second limit side 12 away from the slide slot 14 and the limit arm 151 is formed for the limit arm 151 to move therein.

Two sides of the tray body 2 respectively includes a slide bar 21 corresponding to and limited in the slide slot 14. The slide bar 21 includes a first clamp site 211 corresponding to the limit clamp point 152. When the camber surface 1521 of the limit clamp point 152 is completely clamped into the first clamp site 211, and without external force, the tray body 2 will be limited in the slide slot 14 without any movement.

When the slider bar 21 slides into the slide slot 14, and while the limit clamp point 152 is sliding into the first clamp site 211, the limit arm 151 moves under the pressure of the slider bar 21, and the gap 112 provides the space for the limit arm 151 to move therein.

When the limit clamp point 152 slides into the first clamp site 211, it can be observed through the first through hole 111 of the first limit side 11 whether the limit clamp point 152 has been fully clamped into the first clamp site 211. If the limit clamp point 152 fails to be fully clamped into the first clamp site 211, the limit arm 151 will warp towards the gap 112.

The input mounting area 31 includes four first mounting sites 311 for mounting input adapters 100, and two cable entry ports 312 for mounting input cables. Two sides of the first mounting sites 311 are respectively provided with a T-shaped baffle plate 316 for clamping the input adapter 100. A removable baffle sheet 315 is arranged at openings of the first mounting sites 311 and of the cable entry ports 312. When mounting the input adapter 100, the baffle sheet 315 needs to be broken off, and the input adapter 100 needs to be clamped between an opening at the baffle sheet 315 and the T-shaped baffle plates 316 on both sides. When the tray body 2 is dragged, the input adapter 100 and the fibers in the tray body can be avoided from affecting the stability of the adapter caused by the dragging. The T-shaped baffle plates 316 can also act as stiffeners to increase the rigidity of the tray body 2. The input adapter 100 mounted in the first mounting site 311 may be an MTP/MPO adapter, an LC adapter or an SC adapter. In the process of mounting, the SC adapter, the LC adapter and the quantity thereof may be selected flexibly according to actual practice, so that the present disclosure possesses promising universality.

The cable entry ports 312 are arranged on both sides of the first mounting sites 311. The bottom of each of the cable entry ports 312 is provided with a cable fixing seat 313 which includes second through holes 314. In the process of mounting, the baffle sheet 315 at the opening of the first mounting site 311 in which the input adapter 100 needs to be mounted is removed, and the input adapter 100 is mounted in the first mounting site 311. If cables are mounted in the input, the input cables are bunched at the cable entry ports 312, and fixed to the cable fixing seat 313 using a bondage which passes through the second through holes 314. When the tray body 2 is dragged, the input cables and the fibers in the tray body can avoid from moving caused by the dragging. The baffle sheets 315 where no adapter or cable needs to be mounted are not to be removed. In use, the baffle sheets 315 may keep dust from entering the distribution cabinet 400.

The fiber storage area 33 is provided with an excess length regulating device 332 consisting of multiple arc-shaped restraint units 336 which are fixed on the fiber storage area 33 at certain intervals to form the excess length regulating device 332. Because the lengths of fiber lines between the input and output are different, the fiber lines in the fiber storage area 33 are loose and messy. Some overlong fiber lines are even squeezed out of the fiber storage area 33. Coiling the fiber lines along outsides of the arc constraint units 336 may make the tightness of the coiled fiber lines in a certain degree of flexibility. The arc-shaped restraint units 336 may prevent the fiber lines from being squeezed out of the fiber storage area 33.

The fiber storage area 33 is provided with a removable welding socket 331 which may be mounted from two directions. The welding socket 331 is provided with a first clamp buckle 3311, a positioning column 3312, a plurality of separated welding protection sleeve slots 3313 and a plurality of separated optical splitter slots 3314.

The welding socket may be mounted or not mounted in the fiber storage area 33 as needed. When the welding socket 331 needs to be mounted, the welding socket 331 is required to be clamped to the fiber storage area 33. The welding protection sleeve slots 3313 and the optical splitter slots 3314 may be adopted as needed. Merely the welding protection sleeve slots 3313 may be adopted, alternatively, both the welding protection sleeve slots 3313 and the optical splitter slots 3314 need to be adopted at the same time. Different welding sockets 331 can be switched as required.

When the input fiber and output fiber need to be fused, an external side of the welding area thereof will be sleeved with a welding protection sleeve to ensure the stability of signal transmission. The welding protection sleeve of each bundle of fibers is clamped in the welding protection sleeve slots 3313 to ensure that the welding area may not be loosened under external force, and the welding area of each fiber is separated at certain intervals to reduce signal interference. Fiber lines can be respectively clamped in the fiber splitter slots 3314 vertically as needed.

The fiber storage area 33 is provided with a socket mounting area 333, which is arranged in a central position of the excess length regulating device 332. The socket mounting area 333 is provided with a socket mounting hole 334 and positioning holes 335 for mounting the welding socket 331. Two socket mounting holes 334 and two positioning holes 335 are respectively arranged along the X direction. Direction of the welding socket 331 may be adjusted according to the mounting requirements, to meet actual engineering status.

The output mounting area 32 comprises 12 second mounting sites 321, which are arranged side by side linearly, for mounting output adapters 200. The second mounting sites 321 include second bottom holes 323 which facilitate ventilation. A barrier 322 is arranged between each two adjacent second mounting sites 321. The barrier 322 can also serve as a stiffener for increasing the rigidity of tray body 2. The output adapters 200 are mounted in the second mounting sites 321 in an interference fit way. When the tray body 2 is dragged, the output adapters 200 and the fibers in the tray body can be avoided from affecting the stability of the adapters caused by the dragging. The output mounting area 32 can mount up to 12 output adapters 200, which includes 24 output ports in total. The output adapters 200 may be MTP/MPO adapters, LC adapters or SC adapters.

A first supporting side 34 for supporting the cover body 5 is provided on each side of the fiber storage area 33. The first supporting side 34 and a side of the distribution area 3 nearby the side of the input mounting area 31 are both provided with second clamp buckles 36 for clamping the cover body 5 to an upper end surface of the distribution area 3. The second clamp buckles 36 are each of an inverted-L shape. The cover body 5 comprises second clamp sites 51 corresponding to the second clamp buckles 36. The inner side of the cover body 5 is provided with a stiffener 55 for increasing rigidity and a limit bar 56 for mating with the first supporting side 34. When the cover body 5 covers the upper side of the distribution area 3, the limit bar 56 is on the inner side of the first supporting side 34 to ensure that the cover body 5 covers the distribution area 3 at the proper position and may not move from side to side. The cover body 5 is provided with protrusions 53 which may be inserted into the second mounting sites 321 on one side of the cover body 5 close to the output mounting area 32, and an avoidance site 54 which may avoid the barrier 322 is arranged between each of two adjacent protrusions 53. When the cover body 5 covers the upper side of the distribution area 3, the protrusions 53 are inserted into the second mounting sites 321 to assist in fixing the cover body 5. An external side of the cover body 5 is provided with a concave paste area 52 for pasting a sign. The concave paste area 52 can ensure that the pasted sign is not higher than an upper surface of the cover body 5, reducing overall height of the present disclosure. At the same time, the pasted sign may be avoided from being peeled off when the tray body 2 is dragged. The second clamp buckles 36 clamp the cover body 5 to an upper end surface of the distribution area 3 from three directions to protect the adapters and cables inside the distribution area 3. Merely the cover body 5 needs to be opened when line embedding or maintenance is required. The cover body 5 may also be configured as light-weight plastic board with a certain degree of transparency for visually viewing the distribution condition of the distribution area 3.

A bottom of the terminal area 4 is provided with a first bottom hole 41 and a limit block 46 which facilitate plugging and unplugging of the terminal adapter. Side holes 42 are provided in two sides of the terminal area 4 for distribution. Upper sides of the side holes 42 are provided with wire entry grooves 43. An external side of the terminal area 4 is provided with a removable baffle panel 44 and a handle 45 which may drag the tray body 2 inside the slide rail 1. An external surface of the handle 45 is provided with a grain 451 which may increase friction between a user and the handle 45. A side surface of the baffle panel 44 is provided with a stop block 441 corresponding to the limit block 46, which is used to limit mounting range of the baffle panel 44. When the handle 45 is dragged, the tray body 2 may be dragged in and out of slide rail 1. The baffle panel 44 may be designed such that the posted identification sign is easy for inspection by technicians in use. Only by removing the baffle panel 44 may the mounting or maintenance be more convenient.

The terminal adapter may be inserted on the terminal area 4 to link the adapter of the output mounting area 32.

Connection line of the terminal adapter can be organized, i.e., drawn out to outside by inserting into the side hole 42 through the wire entry grooves 43 to avoid disorder among lines.

Figure 7:
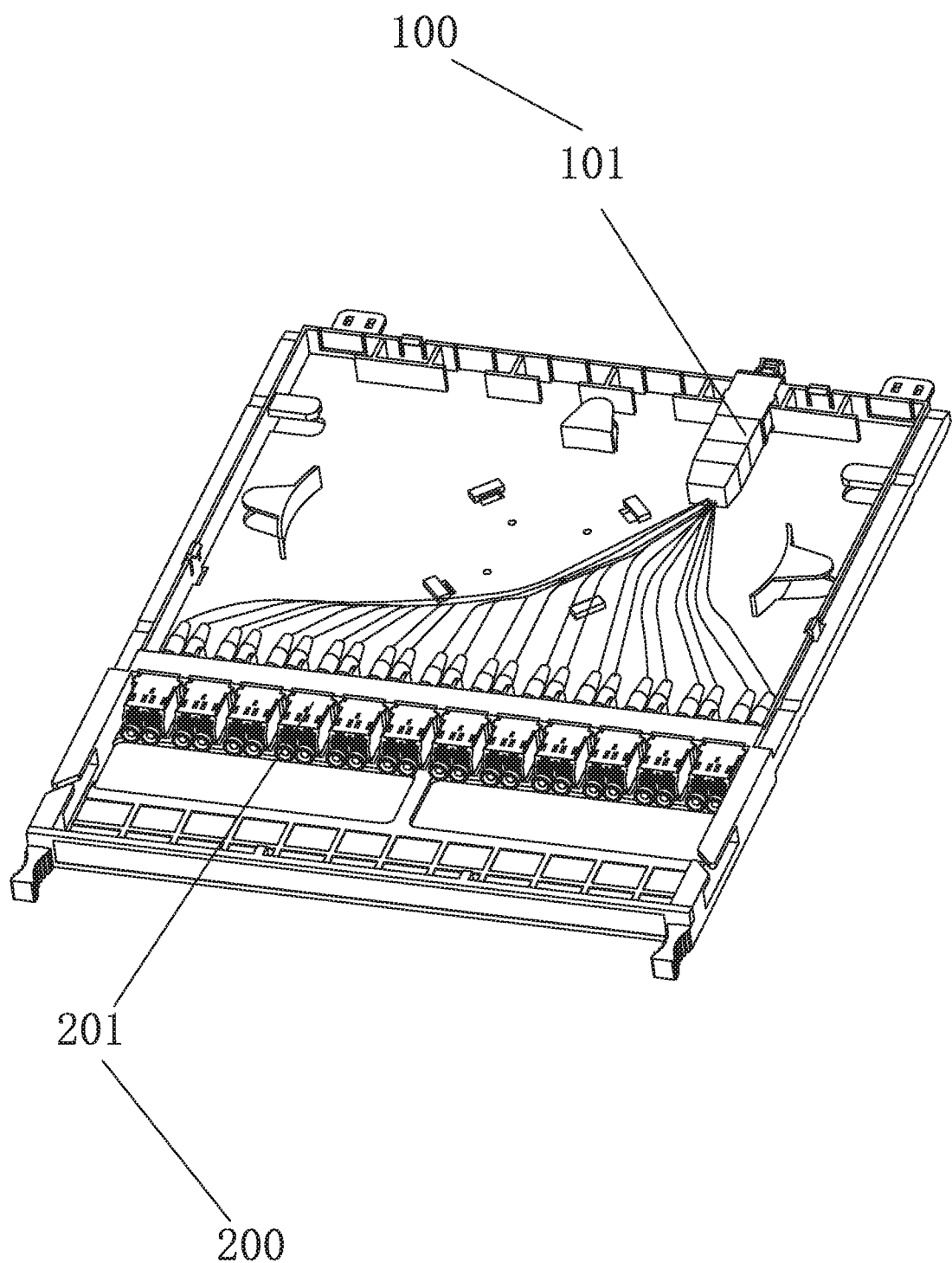
FIG. 7 is a structural schematic view of a welding tray body of the present disclosure, where a conversion between MTP/MPO mode and LP mode between an input and an output is shown.

The present disclosure may realize various mode conversions between an input and an output. As shown in FIG. 7, the input adapter 100 mounted in the input mounting area 31 is 1 PCS MTP/MPO adapter 101 with 24 cores. The output adapter 200 is an LC adapter 201 with 24 cores. This mode is connected by an MTP/MPO-to-24-Core LC fiber jumper. The conversion of the mode does not need to mount the welding socket 331 to realize the conversion between the MTP/MPO mode and the LC mode.

Figure 8:
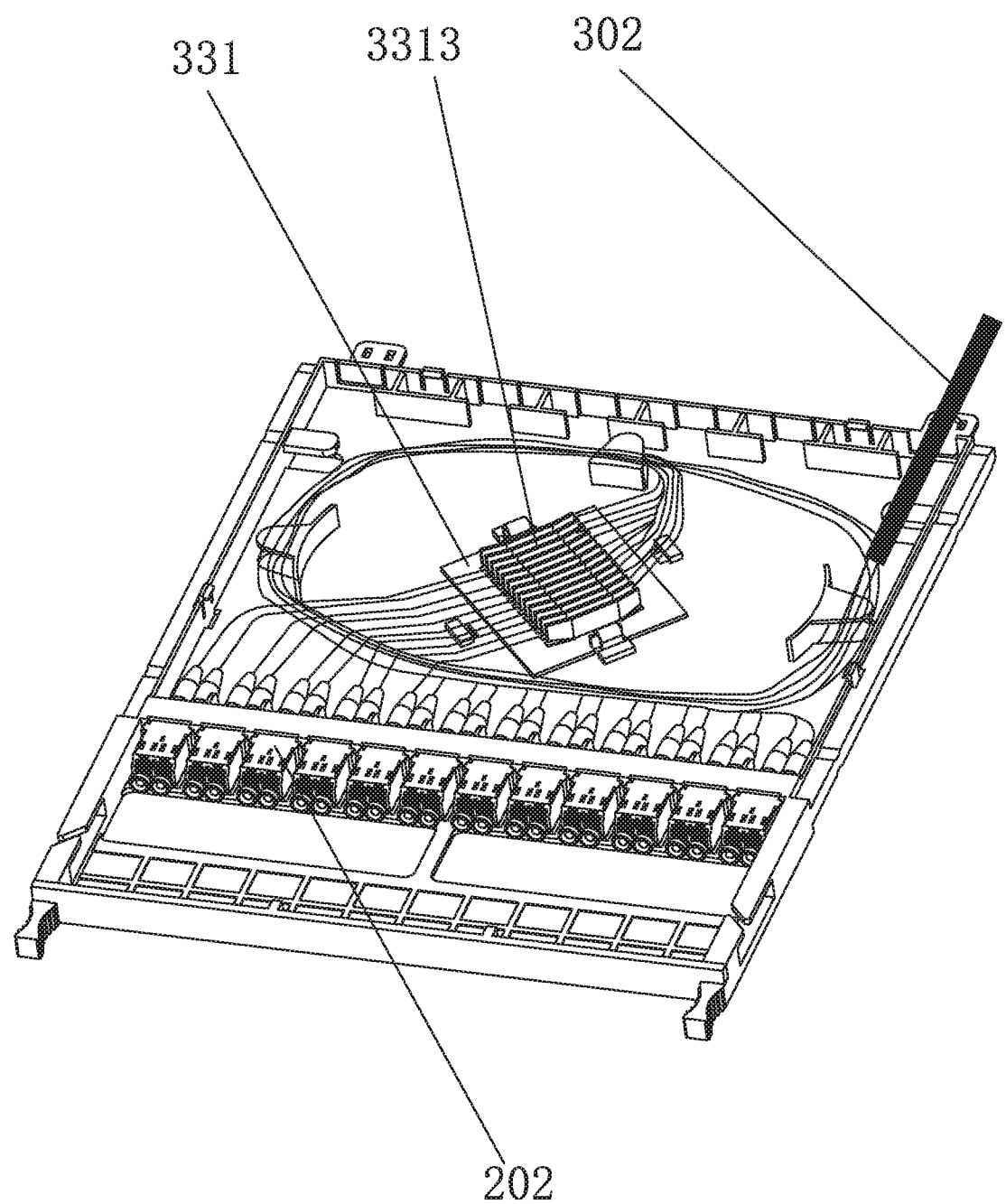
FIG. 8 is a structural schematic view of a welding tray body of the present disclosure, where a conversion between LC optical cable and LC mode between an input and an output is shown.

Referring to FIG. 8, the LC cable 302 is mounted in the input mounting area 31, which LC cable 302 is bunched at the cable entry ports 312, and fixed to the cable fixing seat 313 using a bondage which passes through the second through holes 314. The output adapter 200 is an LC adapter 201 with 24 cores. The conversion of the mode requires to mount the welding socket 331. Furthermore, the welding socket 311 is equipped with a welding protection sleeve slot 3313. The LC cable 103 is welded with a tail fiber of the LC adapter 104. An external side of the welding area is sleeved with a welding protection sleeve to ensure the stability of signal transmission. The welding protection sleeve of each tail fiber is clamped in the welding protection sleeve slot 3313. The mode may realize a conversion between LC and LC mode by MTP/MPO-to-24-Core LC tail fiber connection.

Figure 9:
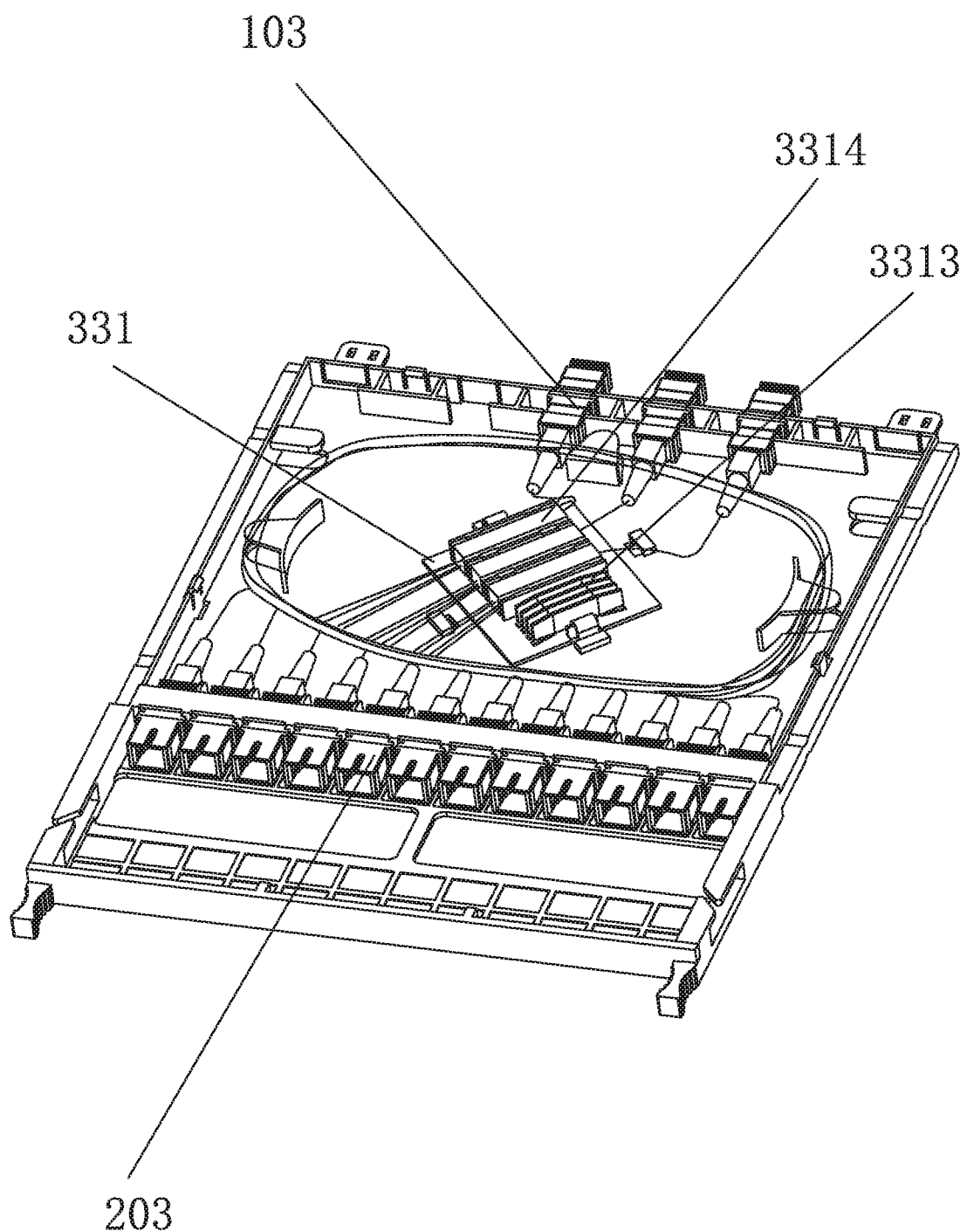
FIG. 9 is a structural schematic view of a welding tray body of the present disclosure, where a conversion between SC and SC mode between an input and an output is shown.

Referring to FIG. 9, the input adapter 100 mounted in the input mounting area 31 adopts three SC adapters 103, each serving one fiber. The output adapter 200 is an SC adapter 203 with 12 cores. Each fiber of the input SC adapter 105 is connected to four fibers from the output SC adapter 106 through a SC mini optical splitter. The conversion of mode requires to mount the welding socket 331. The welding socket 331 is provided with a welding protection sleeve slot 3313 and an optical splitter slot 3314. The SC mini optical splitter is fixed to the optical splitter slot 3314 for protecting fiber connected to the SC mini optical splitter from being loose caused by external force. The conversion between SC and SC mode is then realized.

Figure 10:
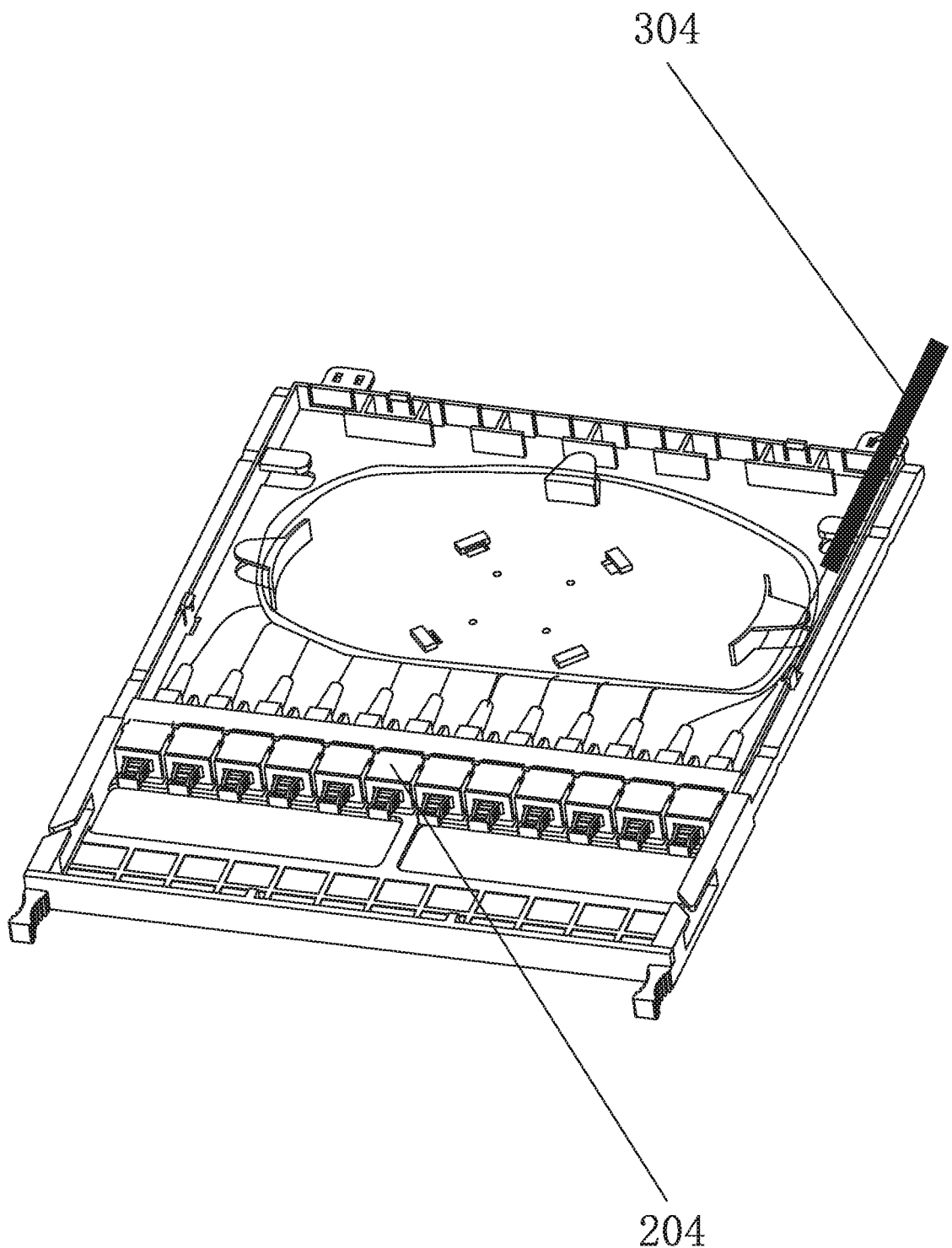
FIG. 10 is a structural schematic view of a welding tray body of the present disclosure, where a conversion between MTP/MPO optical cable and MTP/MPO mode between an input and an output is shown.

Referring to FIG. 10, an MTP/MPO cable 304 is mounted in the input mounting area 31, which MTP/MPO cable 304 is bunched at the cable entry ports 312, and fixed to the cable fixing seat 313 using a bondage which passes through the second through hole 314. The output adapter 200 is an MTP/MPO adapter 204 with 12 cores. Twelve movable connectors of the MTP/MPO cable 304 are directly inserted into the MTP/MPO adapter 204. The conversion of the mode does not need to mount the welding socket 331. The conversion between MTP/MPO and MTP/MPO mode is realized by connecting the input MTP/MPO optical cable 107 and the output MTP/MPO adapter 204.

Figure 11:
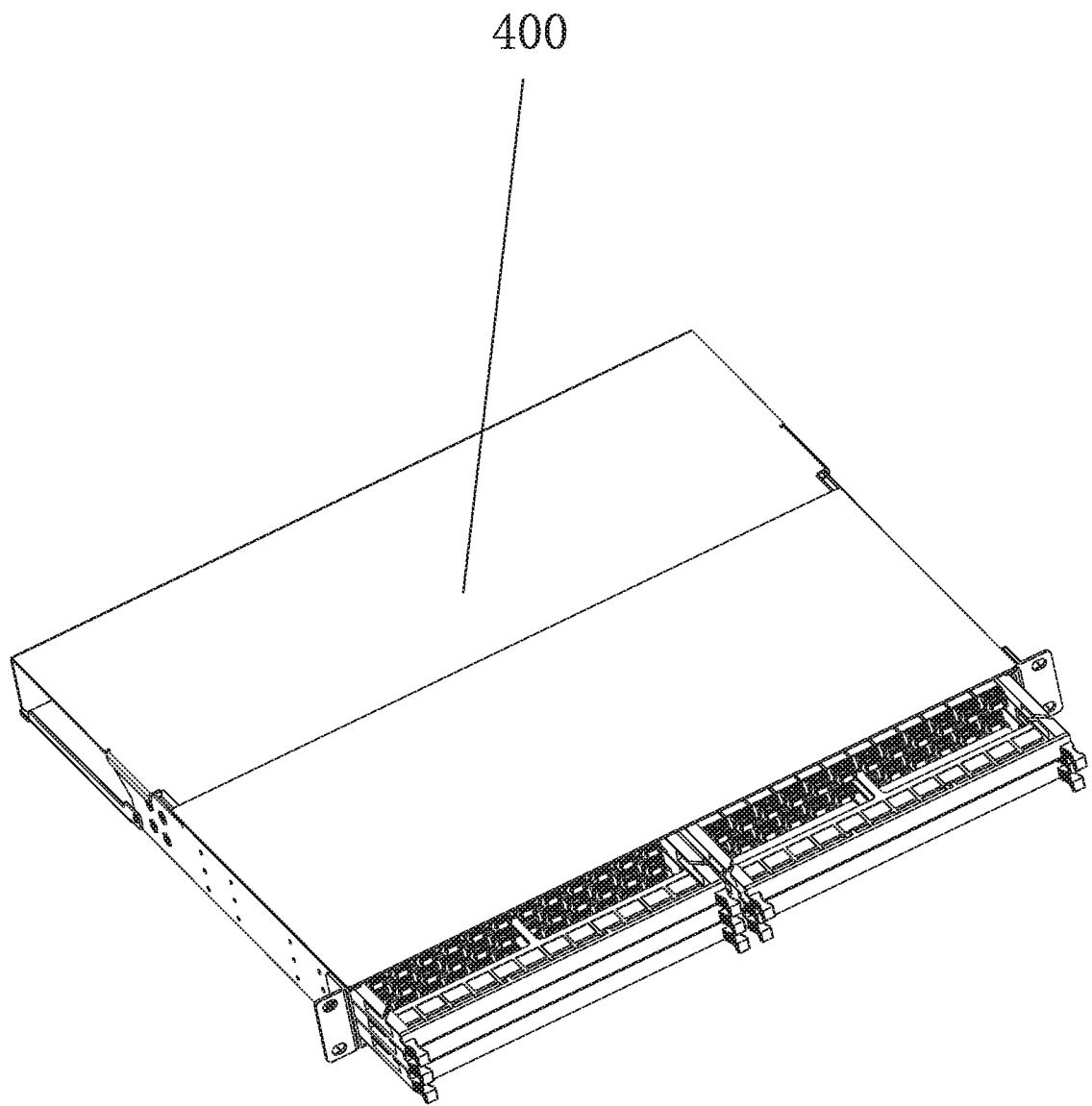
FIG. 11 is a structural schematic view of the present disclosure applied in a distribution cabinet.

Referring to FIG. 11, in practice, the high-density fiber distribution tray of the present disclosure may be mounted in a 1 U distribution cabinet 400. The slide rail 1 may be connected to the distribution cabinet 400 through a thread passing through the screw mounting hole 131. Each distribution cabinet 400 may be equipped with three layers of high-density fiber distribution trays of the present disclosure, each layer containing two of the high-density fiber distribution trays of the present disclosure, forming a layered drawer structure. Six high-density fiber distribution trays of the present disclosure in total may be mounted, each output adapter 200 including two output cores, which means one 1 U distribution cabinet 400 may realize the mounting of 144 cores. Input distributed wires may be inserted into the input adapter 100 through a rear end of the distribution cabinet 400, alternatively, may also be drawn out from each layer of drawers from front and then inserted into the input adapter 100. The terminal adapter and the output adapter 200 may be plugged into each other merely by removing the baffle panel 44. Any tray body 2 may be dragged out of the slide rail 1 by dragging the handle 45 for internal maintenance and overhaul. In actual practice, the terminal area 4 may mount 12 adapters with 24 cores in total. Six terminal areas 4 of the present disclosure may contain 144 cores, thereby achieving purpose of saving space and cost.

The high-density fiber distribution tray of the present disclosure is small in size, thin in thickness with high adapter density and proper distribution. Therefore, a 1 U distribution cabinet 400 can contain 6 high-density fiber distribution tray of the present disclosure, and may meet the volume requirement of 144 cores. At the same time, the welding socket 331 may be removed and different welding sockets 331 may be switched, which realizes a plurality of mode conversions between the input and the output. The tray body 2 may be dragged within the slide rail 1 by dragging the handle 45, and the baffle panel 44 may be removed or mounted as needed, which facilitate mounting and maintenance for distributing or connecting cable. The present disclosure is compact in structure, ease of mounting, low in duty factor, realizing miniaturization and high density of the fiber distribution tray in the premise of guaranteeing fiber transmission performance.

What is claimed is:

1. A high-density fiber distribution tray, comprising a tray body (2) in which a plurality of mode conversions between an input and an output are achieved; the tray body (2) is provided with a distribution area (3), a terminal area (4) and a transparent cover body (5) which is removable and clamped to the distribution area (3); the distribution area (3) includes an input mounting area (31), an output mounting area (32) and a fiber storage area (33) arranged between the input mounting area (31) and the output mounting area (32), wherein the fiber storage area (33) includes a removable welding socket (331) which is mounted from a plurality of directions; the terminal area (4) is arranged on a side surface of the output mounting area (32), wherein side holes (42) are provided in two sides of the terminal area (4) for distribution, an external side of the terminal area (4) is provided with a removable baffle panel (44) and a handle (45) which may drag the tray body (2) inside a slide rail (1), and a bottom of the terminal area (4) is provided with a first bottom hole (41) for facilitating plugging and unplugging of a terminal adapter; the input mounting area (31) includes a cable entry port (312) for mounting input cables, and a bottom of the cable entry port (312) is provided with a cable fixing seat (313).

2. The high-density fiber distribution tray of claim 1, further comprising a slide rail (1); the tray body (2) is limited within the slide rail (1) and dragged in the slide rail (1); the slide rail (1) includes a first limit side (11), a second limit side (12) and a fixed side (13); a slide slot (14) is enclosed by the fixed side (13), the first limit side (11) and the second limit side (12); the first limit side (11) and/or the second limit side (12) is provided with a first through hole (111), a limit arm (151) extending from an inner side surface of the first through hole (111), and a limit clamp point (152) arranged on the limit arm (151) and facing the slide slot (14).

3. The high-density fiber distribution tray of claim 2, wherein the limit arm (151) is thinner than the first limit side (11) or the second limit side (12); a gap (112) between a side of the first limit side (11) or the second limit side (12) away from the slide slot (14) and the limit arm (151) is formed for the limit arm (151) to move therein; two sides of the tray body (2) respectively include a slide bar (21) corresponding to and limited in the slide slot (14); the slide bar (21) includes a first clamp site (211) corresponding to the limit clamp point (152).

4. The high-density fiber distribution tray of claim 1, wherein the bottom of the terminal area (4) is provided with a limit block (46) which facilitate plugging and unplugging of the terminal adapter; wire entry grooves (43) are provided in upper sides of the side holes (42); an external surface of the handle (45) is provided with a grain (451) which increases friction between a user and the handle (45); a side surface of the baffle panel (44) is provided with a stop block (441) corresponding to the limit block (46).

5. The high-density fiber distribution tray of claim 1, wherein a first supporting side (34) for supporting the cover body (5) is provided on two sides of the fiber storage area (33); the first supporting side (34) is provided with a second clamp buckle (36) for clamping the cover body (5) to an upper end surface of the distribution area (3); the second clamp buckle (36) is of an inverted-L shape.

6. The high-density fiber distribution tray of claim 5, wherein the cover body (5) comprises a second clamp site (51) corresponding to the second clamp buckle (36); an external side of the cover body (5) is provided with a concave paste area (52) for pasting a sign; an inner side of the cover body (5) is provided with a stiffener (55) for increasing rigidity and a limit bar (56); the cover body (5) is provided with protrusions (53) which are inserted into the output mounting area (32) on one side of the cover body (5) close to the output mounting area (32), and an avoidance site (54) is arranged between each of two adjacent protrusions (53).

7. The high-density fiber distribution tray of claim 1, wherein the input mounting area (31) includes a first mounting site (311) for mounting an input adapter (100); two sides of the first mounting site (311) are respectively provided with a T-shaped baffle plate (316) for clamping the input adapter (100); the cable fixing seat (313) includes a second through hole (314); a removable baffle sheet (315) is arranged at openings of the first mounting site (311) and of the cable entry ports (312).

8. The high-density fiber distribution tray of claim 1, wherein the fiber storage area (33) is provided with an excess length regulating device (332) consisting of a plurality of arc-shaped restraint units (336); the fiber storage area (33) is provided with a socket mounting area (333), which is arranged in a central position of the excess length regulating device (332); the socket mounting area (333) is provided with a plurality of socket mounting holes (334) and a plurality of positioning holes (335) for mounting a welding socket (331).

9. The high-density fiber distribution tray of claim 1, wherein the output mounting area (32) comprises a plurality of second mounting sites (321), which are arranged side by side linearly, for mounting output adapters (200); the second mounting sites (321) include second bottom holes (323); a barrier (322) is arranged between each two adjacent second mounting sites (321).

10. The high-density fiber distribution tray of claim 1, wherein the welding socket (331) is provided with a first clamp buckle (3311), a positioning column (3312), a welding protection sleeve slot (3313) and/or an optical splitter slot (3314).

* * * * *